(12) United States Patent
Brady

(10) Patent No.: US 7,329,356 B2
(45) Date of Patent: Feb. 12, 2008

(54) FLOCCULATING AGENT FOR CLARIFYING THE WATER OF MAN-MADE STATIC WATER BODIES

(75) Inventor: Brent S. Brady, Murietta, CA (US)

(73) Assignee: Aquagems Laboratories, LLC, Murietta, CA (US)

( * ) Notice: Subject to any disclaimer, the term of this patent is extended or adjusted under 35 U.S.C. 154(b) by 320 days.

(21) Appl. No.: 11/019,653

(22) Filed: Dec. 21, 2004

(65) Prior Publication Data
US 2006/0131242 A1    Jun. 22, 2006

(51) Int. Cl.
*C02F 1/52* (2006.01)
*C02F 101/10* (2006.01)

(52) U.S. Cl. .............. 210/712; 210/702; 210/724; 210/906; 210/912

(58) Field of Classification Search .......... 210/724
See application file for complete search history.

(56) References Cited

U.S. PATENT DOCUMENTS

| | | | |
|---|---|---|---|
| 4,507,206 A | | 3/1985 | Hughes |
| 4,882,072 A | | 11/1989 | Eberhardt |
| 5,039,427 A | | 8/1991 | Conover |
| 5,543,056 A | * | 8/1996 | Murcott et al. ............. 210/705 |
| 6,027,649 A | * | 2/2000 | Benedek et al. ............ 210/639 |
| 6,146,539 A | * | 11/2000 | Mills .......................... 210/712 |
| 6,165,369 A | | 12/2000 | Tanis et al. |
| 6,409,926 B1 | * | 6/2002 | Martin ....................... 210/709 |
| 6,420,312 B2 | | 7/2002 | Nier et al. |
| 6,929,759 B2 | * | 8/2005 | Fruh et al. ................... 252/181 |
| 7,157,009 B2 | * | 1/2007 | Nichols et al. ............. 210/721 |

FOREIGN PATENT DOCUMENTS

KR    2002074806 A    * 10/2002

OTHER PUBLICATIONS

Eaglebrook Dry Pass. Material Safety Data Sheet. ISO 9002 Eaglebrook Inc. du Canada Sep. 18, 2003. 4 pages.
Eaglebrook Alum MSDS. Material Safety Data Sheet. Eaglebrook, Matteson, IL Aug. 11, 2004. 9 pages.
Industrial Specialties News: Handy Bullish on Outlook for polyaluminum Silicate Sulfate. http://static.highbeam.com/i/industrialspecialtiesnews/april301990/h... Dec. 16, 2004 in 2 pages.
NSF Certified Products—Public Water Supply Treatment Chemicals. http://www.nsf.org/Certified/PwsChemicals/Listings.asp?Company . . . Dec. 16, 2004 in w pages.
PASS 100—infochems.com: Trade name information http://infochems.com/products/productinfo.asp?product_id+22930 Dec. 16, 2004 in 2 pages.

\* cited by examiner

*Primary Examiner*—Peter A. Hruskoci
(74) *Attorney, Agent, or Firm*—Knobbe Martens Olson & Bear, LLP

(57) ABSTRACT

A method is described for clarifying man-made static water bodies in which polyaluminum silicate sulfate is added to the water of the water body. Superior flocculation is achieved through the use of polyaluminum silicate sulfate which results in cleaner and more aesthetically pleasing water at a lower cost and with less waste material. Polyaluminum silicate sulfate is also available in a dry form which makes transport and storage easier and less costly. The effect of adding polyaluminum silicate sulfate is a cleaner, clearer, sparkling water body.

20 Claims, No Drawings

FLOCCULATING AGENT FOR CLARIFYING THE WATER OF MAN-MADE STATIC WATER BODIES

BACKGROUND OF THE INVENTION

1. Field of the Invention

This invention relates to a treatment of water within a man-made static water body. More specifically, the invention relates to treatment of water within a man-made static water body with polyaluminum silicate sulfate to reduce algae growth and precipitate suspended solids in the water.

2. Description of the Related Art

Algae growth in a water body can manifest in a coating of slime on the surfaces of the water body, unpleasant green coloring of the water and eventually can lead to the proliferation of other aquatic life forms which can be a health hazard to humans. Algae and other contaminants can be introduced to the water of a water body from the environment, users of the water body and the water source itself. Contaminants in the water can have many negative effects. At certain levels, some contaminants can cause health hazards for those who come into contact with the water body. Many products and treatments currently exist to maintain the safety of the water in water bodies. However, one of the most important aspects for many water bodies is the appearance of the water within them. For example, a crystal clear swimming pool can denote status and gives the impression that the water is clean. Another example would be a fountain in which clear flowing water is pleasing to the eyes. Most man-made static water bodies are treated with chemicals and filters to increase the aesthetic value of the water body.

There are currently many products available for treating water in a man-made static water body to reduce algae growth. However, many conventional algaecides are biological poisons which can do harm to other aspects of the water body. For example, many algaecides are toxic to other forms of life that may be found within the water body. More specifically, many algaecides are toxic to fish and humans and can cause irritation and damage to skin. Many algaecides are damaging to the materials used in the construction of the water body as well. Also, an additional flocculent is usually required to precipitate algae treated by the algaecide as well as other organic material in the water in order to clarify the water.

Aluminum sulfate (alum) has been used in man-made static water bodies as deflocculating agents. Alum also been used to reduce algae growth by taking phosphorus, a nutrient for algae, out of the water. Lanthanum chloride has also been used to sequester phosphate and starve algae in a swimming pool. However, lanthanum chloride requires a separate flocculating agent to clarify the water. Currently used flocculating agents are problematic in that the resulting flocs produced are often too small to be effectively filtered. Also, the large amount of sludge produced by conventional flocculating agents presents a problem for waste disposal.

SUMMARY OF THE INVENTION

One aspect of the invention is a method of treating water in a man-made static water body including adding a quantity of polyaluminum silicate sulfate to the water in the man-made static water body sufficient to reduce algae growth and decrease suspended solids.

Another aspect of the invention is a method of treating water in a man-made static water body including adding a compound to the water which maintains the pH of the water in a pre-selected range, adding a quantity of polyaluminum silicate sulfate to the water sufficient to reduce algae growth and precipitate suspended solids and clarifying the water by removing the precipitate.

DETAILED DESCRIPTION OF THE PREFERRED EMBODIMENT

Embodiments of the invention relate to methods for treating water with a polyaluminum sulfate compound. In this embodiment, polyaluminum silicate sulfate ("PASS") is added to the water of a man-made static water body, for example a swimming pool, a wading pool, a spa, a hot tub, a Jacuzzi, a sauna, a decorative pond, a rock garden or a fountain. "Static" in this context refers to the fact that the water bodies described herein do not have overall flow-through and the water within them is infrequently replenished or exchanged. In many or most such water bodies, the water is contained within a man-made structure, such as a swimming pool lined with plaster. Another characteristic of most such water bodies is that the water in them is continuously or periodically recirculated, often through a filter. Static water bodies present a unique challenge for cleaning and maintenance because of their relatively constant water content and need for a clean and clear appearance.

Water in a static water body that is infrequently replenished or exchanged becomes increasingly contaminated from the environment and users. Also, bacteria and algae are better able to grow in stagnant water. Algae in particular effect the look and feel of a water body, causing a green color in the water and slime on surfaces contacting the water. Also, most man-made static water bodies are especially scrutinized for their appearance, for example, a swimming pool that sparkles and appears clean is more aesthetically appealing, implies greater status and invites more use. As a result, it is important to have treatments for the water in man-made water bodies which do a superior job of clarifying the water and making it appear clean and clear.

PASS is superior to treatments currently in use for man-made static water bodies because it is better able to remove contaminants and reduce algae growth. PASS acts as a flocculating agent and precipitates out suspended solids, for example, phosphorus, algae, metals, organic carbon, bacteria and protozoa. Phosphorus is a nutrient for algae and so by sequestering suspended phosphorus and precipitating it out of the water, PASS starves existing algae in the water, thereby reducing the growth of algae within the water body. Once the amount of phosphate has been reduced, less algaecide is required to keep algae levels from increasing. Since most algaecides are poisons and toxic to other forms of life, it is advantageous to use less algaecide in water bodies. PASS can also remove coloring from the water due to suspended colloids and turbidity, thereby greatly improving the look and feel of the water. PASS is also effective at precipitating out dissolved metals which can stain surfaces and promote algae and bacterial growth. Water treated with PASS appears clearer and cleaner and increases the aesthetically pleasing "sparkle" effect for pools, spas, fountains and all man-made static water bodies.

As a flocculent, PASS precipitates the unwanted solids suspended in the water of the water body and aggregates them into larger particles called flocs. PASS is able to precipitate more suspended solids than currently used flocculents because of the silicate present in the compound. The silicate in PASS is believed to act as a mineral agent of polymerization which allows PASS to reach a higher stable molecular weight than other known coagulants such as alum, polyaluminum chloride and ferric salts. When PASS is introduced to water with suspended solids, its ability to remain stable at higher molecular weights allows it to attract more suspended solids and precipitate them out of solution. The result is that PASS creates larger flocs, which are resistant to shearing and easier to remove from solution through direct filtration than flocs created by currently used flocculants. In addition, the resulting sludge created by PASS is more dense and compact than the sludge created by other coagulants which results in a smaller volume of sludge that is more easily filtered.

Another aspect of the ability of PASS to form higher molecular weight flocs is that a smaller amount of PASS can be added to precipitate a particular amount of suspended solids than many other flocculents currently in use in man-made static water bodies. The result is less comparative cost as well as a smaller volume of waste material that must be removed and disposed of after filtration.

In one embodiment, once the unwanted solids are precipitated out of solution, they can be removed from the water through, for example, a filtration system. In many examples of man-made static water bodies, the filtration occurs continuously or periodically. In some embodiments, the filtration is integrated into the recirculation system of the water within the water body. For example, many pools, spas and fountains contain integrated filtration systems.

Unlike many flocculents currently used in man-made static water bodies, PASS is commercially available in a dry form as well as a liquid form. Preferably, PASS is added to the water of a water body in the dry form, but the invention also comprises adding PASS in the liquid form. It is advantageous to have a flocculent in a dry form for ease of shipping, transporting and storing. Flocculents are generally corrosive in their liquid forms which makes them more difficult to transport. Also, spills of flocculents in liquid form must be treated as hazardous material cleanups. PASS in its dry form, however, is less dangerous, easier to clean up when spilled and more versatile in terms of transport, marketing, stocking and use. Also, PASS in the dry form is at a higher concentration than in solution, requiring a smaller volume to be transported and used.

In one embodiment of the invention, PASS is added to the water of a water body on regular periodic intervals. For example, PASS could be added at least monthly, biweekly, weekly, every 3 days, every other day, daily or hourly. Preferably, PASS is added on at least a weekly basis to maintain clarity of the water and prevent increases in algae growth and the growth of other organisms.

The amount of PASS required to efficiently reduce algae growth and remove suspended solids can vary depending on the water body in which the water is being treated. In one embodiment, for an initial dose, 0.1-50 ounces of PASS is added for every 10,000 gallons of water in the water body. In another embodiment, 0.1-1.0 ounces is added for every 1000 gallons of water in the water body. In yet another embodiment, 0.001-1.0 ounces is added for every 100 gallons of water in the water body. In still another embodiment, 0.00001-1.0 ounces is added for every gallon of water in the water body. In some embodiments, the amount of PASS added can subsequently be reduced after the initial treatment to a lower maintenance dosage. Maintenance dosages vary from about 5% to about 95% of initial dosages. In some embodiments, 1-5 ounces of PASS are added daily, every 2-3 days or every week.

In some embodiments, the water of the water body is maintained at a certain temperature. The temperature maintained in a water body being treated with PASS can be for example, between 0° C. and 100° C., between 10° C. and 80° C., between 20° C. and 70° C., between 0° C. and 20° C., between 20° C. and 100° C. and between 15° C. and 60° C. and In other embodiments the water in the water body is not maintained at a certain temperature.

In some embodiments, a compound other than PASS is first used to maintain a pH in a range between 6.0 and 11.0 in the water body. In one embodiment, the pH is maintained in a range between 6.5 and 9.5. In another embodiment, the pH is maintained in a range between 6.5 and 10.0. Preferably, the pH is maintained in a range between 7.0 and 8.5. The initial compound can be any pH affecting compound, for example buffered hydrochloric acid or buffered sulfuric acid. In one embodiment, PASS is then added to the water of the water body in an amount sufficient to precipitate unwanted solids in solution, such as phosphorus, organic matter, algae, bacteria, protozoa, inorganic material, phosphorus, and metals. In some embodiments, a filtration system is then used to remove the precipitated material from the water. For example, many swimming pools, spas and fountains have attached filtration systems which can be used to filter the water after treatment with PASS to remove precipitated matter.

EQUIVALENTS

The foregoing written specification is considered to be sufficient to enable one skilled in the art to practice the invention. The foregoing description details certain preferred embodiments of the invention and describes the best mode contemplated by the inventors. It will be appreciated, however, that no matter how detailed the foregoing may appear in text, the invention may be practiced in many ways and the invention should be construed in accordance with the appended claims and any equivalents thereof.

What is claimed is:

1. A method of treating water in a man-made static water body, comprising:
   adding a quantity of polyaluminum silicate sulfate to the water in said man-made static water body sufficient to reduce algae growth and decrease suspended solids.

2. The method of claim 1, wherein the suspended solids comprise organic matter.

3. The method of claim 2, wherein the organic matter comprises algae, bacteria and protozoa.

4. The method of claim 1, wherein the suspended solids comprise inorganic matter.

5. The method of claim 4, wherein the inorganic matter comprises phosphorus and metals.

6. The method of claim 1, wherein the polyaluminum silicate sulfate is added on a regular periodic basis.

7. The method of claim 1, further comprising maintaining the pH of the water at a pre-selected range through use of a compound other than polyaluminum silicate sulfate prior to adding the polyaluminum silicate sulfate.

8. The method of claim 7, wherein the compound is selected from the group consisting of buffered hydrochloric acid and buffered sulfuric acid.

9. The method of claim 7, wherein the pre-selected range for the pH of the water is maintained between 6.0 and 11.0.

10. The method of claim 7, wherein the pre-selected range for the pH of the water is maintained between 7.0 and 8.5.

11. The method of claim 1, wherein the water is recirculated within the man-made static water body.

12. The method of claim 1, wherein decreasing suspended solids is achieved by precipitating out the suspended solids and causing precipitated material to form.

13. The method of claim 12, further comprising the removal of the precipitated material through filtering.

14. The method of claim 12, wherein the filtering is continuous.

15. The method of claim 1, wherein the man-made static water body is selected from the group consisting of a swimming pool, a wading pool, a spa, a hot tub, a Jacuzzi, a sauna, a decorative pond, a rock garden and a fountain.

16. The method of claim 1, wherein water temperature is between 0° C. and 20° C.

17. The method of claim 1, wherein water temperature is between 20° C. and 100° C.

18. A method of treating water in a man-made static water body comprising:

a) adding a compound to the water which maintains the pH of the water in a pre-selected range;

b) adding a quantity of polyaluminum silicate sulfate to the water sufficient to reduce algae growth and precipitate suspended solids; and c) clarifying the water by removing precipitate.

19. The method of claim 18, wherein the polyaluminum silicate sulfate is added on a regular periodic basis and the pH of the water is maintained between 6.5 and 10.0.

20. The method of claim 18, wherein the suspended solids are phosphorus and organic matter.

* * * * *